BARRIER

Original Filed June 3, 1964 2 Sheets-Sheet 1

INVENTOR
ALBERT B. GREENFIELD
BY Seidel & Honda
ATTORNEYS.

BARRIER

Original Filed June 3, 1964 2 Sheets-Sheet 2

INVENTOR
ALBERT B. GREENFIELD
BY Seidel & Gonda

ATTORNEYS.

United States Patent Office

Re. 26,203
Reissued May 16, 1967

26,203
BARRIER

Albert B. Greenfield, 1311 Huntingdon Pike, Huntingdon Valley, Pa. 19006

Original No. 3,208,730, dated Sept. 28, 1965, Ser. No. 372,257, June 3, 1964. Application for reissue Apr. 21, 1966, Ser. No. 572,868
9 Claims. (Cl. 256—1)

Matter enclosed in heavy brackets [ ] appears in the original patent but forms no part of this reissue specification; matter printed in italics indicates the additions made by reissue.

In general, this invention relates to a novel barrier. More particularly, it relates to a novel barrier which is adapted to prevent the removal of shopping carts or other wheeled vehicles from the premises of a self-service store.

Heretofore, self-service stores such as supermarkets have had on effective control over the shopping carts that are provided to hold the articles selected by a shopper until there cost can be tabulated and the purchase thereof completed. As a result of this lack of control, self-service stores using shopping carts have been forced to incur substantial losses through theft and damage to the shopping carts.

It has been determined that shopping cart losses can be substantially reduced if the carts can be retained upon the store premises. It therefore is the general object of this invention to provide a novel means for retaining self-service shopping carts upon the immediate premises of the store in which they are intended to be used.

It is another object of this invention to provide a novel barrier for retaining shopping carts upon the premises of a self-service store.

It is yet another object of this invention to provide a novel barrier which retains shopping carts upon the premises of a self-service store without interfering with the normal use of the store or the shopping carts.

It is still another object of this invention to provide a novel barrier which prevents the removal of shopping carts from the premises of the self-service store but does not interfere with the normal ingress and egress of persons to and from the store.

It is another object of this invention to provide a novel barrier which prevents the removal of shopping carts from a predetermined portion of the premises of a self-service store but does not interfere with or modify the normal operation of said store.

It is a further object of this invention to provide a novel barrier through which persons and wheeled vehicles other than store owned shopping carts may pass, but said barrier blocks the passage of store owned shopping carts.

Other objects will appear hereinafter.

For the purpose of illustrating the invention, there is shown in the drawings a form which is presently preferred; it being understood, however, that this invention is not limited to the precise arrangements and instrumentalities shown.

Referring to the drawing in detail, wherein like numerals indicate like elements, there is shown in FIGURE 1 a barrier constructed in accordance with the present invention designated generally as 10.

Figure 1:
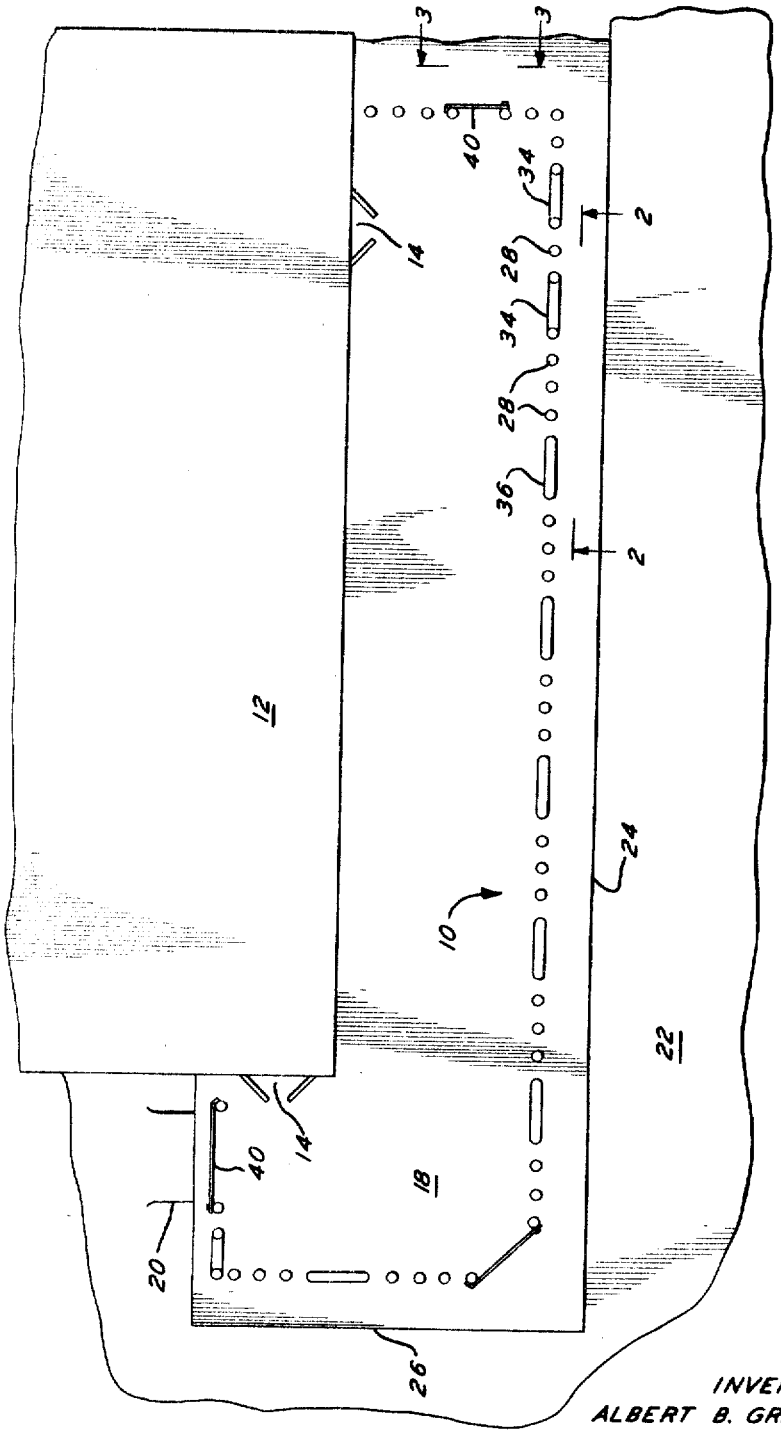
FIGURE 1 is a top plan view of the barrier in accordance with the present invention and a building structure with which the barrier is used.

As shown, the barrier is arranged to enclose a portion of a building 12 including entrance ways 14. The building 12 may be a self-service store such as a supermarket. A pedestrian walkway or sidewalk 18 adjoins the building 12 and the ramp 20 slopes down from the pedestrian walkway to a street, parking lot or other motor vehicle driveway 22. The driveway 22 adjoins the building 12 and walkway 18.

The barrier 10 is mounted on the walkway 18 with a substantial portion of it extending along the walkway edges 24 and 26. Thus a large portion of the walkway is left open, and pedestrian traffic can move freely thereon.

Figure 2:
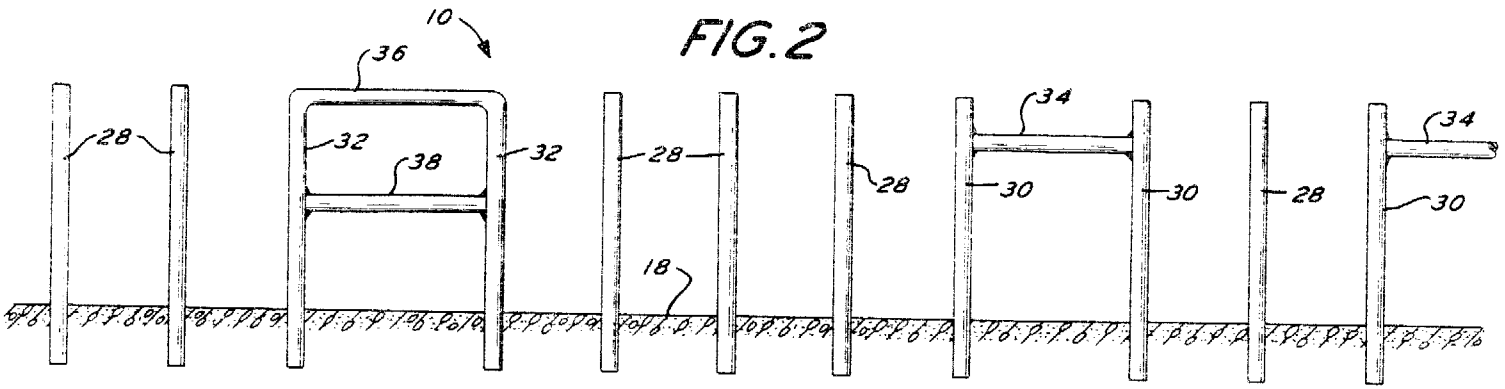
FIGURE 2 is a front elevational view of a portion of the barrier shown in FIGURE 1 taken along the line 2—2.

Referring now more particularly to the barrier itself, a portion thereof is shown in FIGURE 2. It is to be understood that the portion of barrier 10 shown in FIGURE 2 is representative and it is chosen merely to clarify the description.

As shown, the barrier comprises a series of upright posts 28 mounted in walkway 18. Posts 28 are uniformly spaced from each other and from upright posts 30 and 32, also comprising a part of the barrier. Posts 30 and 32 are spaced from each other a greater distance than posts 28 are spaced apart. A horizontal cross piece 34 extends between posts 30 and is joined at its ends to the posts. Cross pieces 36 and 38 extend between posts 32 and are joined at their ends to the posts 32.

Posts 28, 30 and 32 and the cross pieces 34, 36 and 38 are made of a rigid material which cannot be bent or distorted except with great force. For this purpose, the post and cross pieces may be constructed from two inch galvanized steel pipe.

Figure 4:
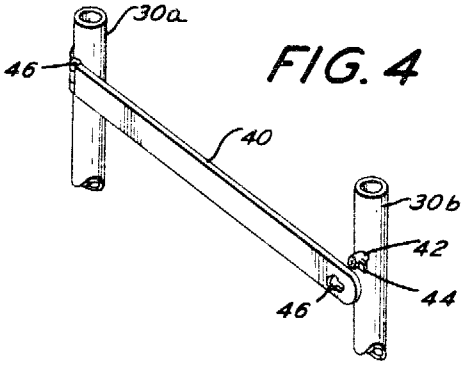
FIGURE 4 is a perspective view of a portion of the barrier showing a pivotable bar which may be pivoted to provide an enlarged opening in the barrier.
Figure 5:
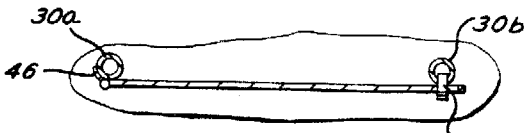
FIGURE 5 is a sectional view of the pivoted bar of FIGURE 3 taken along the line 5—5.
Figure 3:
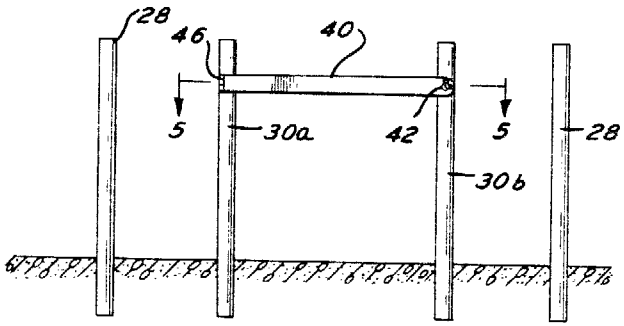
FIGURE 3 is an elevational view of the barrier shown in FIGURE 1 taken along the line 3—3.

In FIGURES 3, 4 and 5 another portion of the barrier 10, taken along the line 3—3 as exemplary, is shown. At this portion of the barrier, the cross piece 34 has been replaced with a cross bar 40. The cross bar 40 is pivotally mounted at one end to posts 30a and its other end is joined to the posts 30b by latch 42. The latch 42 is provided with a tongue 44 which, when inserted through a similarly shaped hole 46 in bar 40 and rotated, holds bar 40 in a closed position. The latch 42 is also provided with a tumbler lock so that it can only be turned when a key is inserted into it. It is to be understood that the latch 42 is not limited to the means shown. For example, latch 42 may also take the form of a hasp and padlock. A hinge 48 is mounted on posts 30a to provide a means for providing bar 40.

The barrier 10 functions in the following manner.

Persons seeking to enter into or exit from the building 12 may pass through the barrier by stepping between the posts 28, or posts 28 and 30 or posts 28 and 32. These are the posts which are not joined by a cross piece 34–38 or bar 40. The distance between such posts has been chosen to be wide enough to allow all but the heaviest of individuals to pass straight through. On the other hand, the distance between such posts is also chosen to be narrow enough to prevent shopping carts owned by the store from being wheeled through the barrier.

The typical shopping cart used by the supermarkets and other self-service stores throughout the country have three or four wheels mounted upon a frame supporting a basket. The frame and basket are in the shape of a truncated wedge. The distance between the posts is chosen to be substantially less than the widest portion of the cart. Thus, the carts can only be pushed partway through the barrier before they become wedged in.

While the precise distance between posts which will fulfill the above set forth requirements may be varied somewhat to meet changed conditions, it has been determined that a distance of 17–19 inches from post edge to post edge fulfills the said requirements.

Persons who desire to enter the building 12 may wish to take privately owned carts, or baby carriages or other types of vehicles into the building. Accordingly, the posts 30 and cross piece 34 have been provided to allow for the entry and exit of such individually owned vehicles without disturbing the primary function of barrier 10. To accommodate the privately owned vehicles, posts 30 are spaced apart a distance sufficient to allow privately owned vehicles to pass therebetween. Cross piece 34 is at a height above the walkway 18 that will allow the individually owned vehicles to pass beneath, either freely or with only minor manipulation.

The height of cross piece 34 must be chosen so that store owned shopping carts cannot pass below it. Further, the distance between posts 30 must be small enough so that no matter how the cast is tilted it cannot pass through the opening defined by posts 30 and cross piece 34. It has been determined that the distance between posts 30 and the height of cross piece 34 which will meet the above set forth requirement may be 29–31 inches from post edge to post edge and 29–31 inches from walkway 18 to the lower part of the cross piece 34. It is of course to be understood that that these differences may be varied somewhat to meet changed conditions. It should also be noted that when bar 40 is latched to post 30b, it and posts 30a and 30b function in the same manner as posts 30 and cross piece 34. Therefore posts 30a and 30b are spaced 29–31 inches and bar 40 is 29–31 inches above walkway 18.

As described above, bar 40 is adapted to be swung open. When this is done, individually owned vehicles which cannot be readily passed beneath cross pieces 36 can pass through the barrier and into or out of the building 12. Vehicles that may have to be passed through the barrier by means of opening bar 40 may include wheel chairs and large perambulators. As shown in FIGURE 1, the portion of the barrier 10 adjacent ramp 20 is provided with a pivotable bar 40.

Normally the bar 40 is kept closed and locked. However, during the store business hours, an attendant with a key will be stationed near each of the bars 40 so that when necessary, he can open it. The attendant may also perform other functions such as loading purchased articles into motor vehicles driven along the side of walkway 18.

It will be noted that barrier 10 is not flush with the walkway edges 24 and 26. These edges are portions of the walkway at which said motor vehicles would normally park for loading. The distance that the barrier is spaced away from edges 24 and 26 is chosen to allow the doors of said motor vehicle to be freely opened. Said distance is also chosen to be close enough to the edges 24 and 26 so that when carts are wedged between the posts the articles carried thereby may be loaded into the vehicle with dispatch and ease.

The distance determined to best fulfill these requirements is 35–37 inches. When the posts are 35–37 inches from the edges 24 and 26, motor vehicle doors may be opened freely. Furthermore, the distance 35–37 inches permits an attendant to load the article from the cart into the motor vehicle with no more than twist of his body or possibly one step.

It has been determined that the overall height of posts 28–32 must be carefully chosen. If they are too high, persons seeking to enter the building react to the sight of the barrier and may turn away. If the posts are too low, then the tendency is not to see them. A height which is well adapted to overcome the above indicated problems is 38 inches. At this height, posts are easily seen and yet they are not so high as to turn away potential customers. Furthermore, this height is sufficiently low to allow the elbows of shoppers carrying packages to pass above the posts.

It is to be understood that the shape of the barrier 10 shown in FIGURE 1 is only illustrative of the invention. In practice, the barrier may be any shape or size. Further, the arrangement of posts consisting of three posts 28 and two posts 30 in that order can be varied. However, the arrangement shown herein has been found to be well adapted to permit free and easy access to the premises enclosed by the barrier without noticeably interfering with pedestrian traffic.

In practice, at least one pivotable cross bar 40 should be placed adjacent each building entrance way. The reason for this is that the customers wishing to use this means of passing through the barrier will tend to approach it at or near the entrance way.

In use, the barrier has shown itself to be very effective. Shopping carts are retained within the barrier 10. In this manner the attendant can watch them and prevent theft. Further, damage to the carts, such as results when they are hit by motor vehicles moving on the store's parking lot, is eliminated. Also carts are protected from the effects of weather.

Hereinafter, posts 28 may be referred to as first pairs of posts. Hereinafter, posts 30 may be referred to as second pairs of posts. Hereinafter, crosspiece 34 may be referred to as a connecting bar. Hereinafter, posts 30a and 30b may be referred to as a third pair of posts. Hereinafter, bar 40 may be referred to as a removable crossbar.

In one instance where the barrier was installed, the store was able to reduce the inventory of carts from 250 to 110. The same store, which was losing 30 to 40 carts per month, has substantially eliminated its loss. As used hereinafter, the orientation of the above-mentioned posts may be referred to as a corral. A corral does not necessarily mean that the posts are in a form of a ring-shaped barrier, but does convey an interpretation that the posts are orientated in a particular manner.

The present invention may be embodied in other specific forms without departing from the spirit or essential attributes thereof and, accordingly, reference should be made to the appended claims, rather than to the foregoing specification as indicating the scope of the invention.

I claim:

1. a barrier comprising a series of posts including first pairs of posts spaced apart by a distance slightly greater than the width of a person so that a person may pass therebetween, second pairs of posts being spaced apart wider than the first pair of posts and having a stationary connecting bar therebetween acting as a barrier to passage of adults therebetween, a third pair of posts more widely spaced apart than the first pairs of posts and having a removable crossbar therebetween permitting passage of persons and objects.

2. A barrier comprising a series of posts each having substantially the same height, said posts including first pairs of posts spaced apart by a distance slightly greater than the width of a person so as to permit passage of persons therebetween, said first pairs of posts being unconnected above ground level, the distance between said first pairs of posts being less than the greatest width of a shopping cart, second pairs of said posts being spaced apart greater than the distance between said first pairs of posts and having a stationary connecting bar therebetween acting as a barrier to passage of adults, a third pair of said posts more widely spaced apart than the first pairs of posts and having a removable crossbar therebetween permitting passage of persons and shopping carts.

3. A barrier comprising a series of posts each having a height of approximately 38 inches, said posts including first pairs of posts spaced apart by a distance of between about 17 and 19 inches so that persons may pass therebetween, second pairs of said posts being spaced apart by a distance of between about 29 and 31 inches and having a stationary connecting bar therebetween acting as a barrier to passage of adults therebetween, a third pair of said posts more widely spaced apart than the first pairs of posts and having a removable crossbar therebetween permitting passage of persons and wheeled vehicles.

4. A building having an entranceway, a barrier cooperating to prevent objects from being removed from the premises adjacent said entranceway, said barrier comprising a series of posts including first pairs of posts spaced apart by a distance slightly greater than the width of a person, second pairs of said posts being spaced apart wider than the first pairs of posts and having a stationary connecting bar therebetween acting as a barrier to passage of adults therebetween, a third pair of said posts more widely spaced apart than the first pairs of posts and having a removable crossbar therebetween permitting passage of persons and objects to and from said premises.

5. A building containing a self-service store and having an entranceway, a barrier cooperating to prevent shopping carts from being removed from the premises adjacent said entranceway, said barrier comprising a series of posts each of substantially the same height, said posts including first pairs of posts spaced apart by a distance slightly greater than the width of a person, said distance being about 17 and 19 inches, second pairs of said posts being spaced apart wider than the first pairs of posts and having a stationary connecting bar therebetween acting as a barrier to passage of adults therebetween, said connecting bar being horizontally disposed, a third pair of posts more widely spaced apart than the first pairs of posts and having a removable crossbar extending therebetween, said crossbar when removed permitting passage of persons and shopping carts between said third pair of posts.

*6. The combination with a building and a vacant and accessible area along a side of the building,*

*of means for controlling access to said area,*

*said means comprising a first plurality of posts arranged to form at least one opening of a height to prevent the passage of a person of average height therethrough and of a width to prevent the passage through of an object of a predetermined size, and a second plurality of posts arranged to form at least one passage of a height to permit the passage of a person of average height therethrough, and of a width smaller than the width of said opening, said posts coacting with the building to form a barrier enclosing said area, the endmost of said second plurality of posts being spaced from adjacent portions of the building a distance substantially equal to the width of said passage to prevent the passage of said object therebetween.*

*7. The combination with a building and a vacant and accessible area along a side of the building of means arranged along a portion of the perimeter of said area and coacting with said building for controlling access to said area, said means including*

*first and second spaced vertical posts and a horizontal cross bar traversing the space between upper portions of said posts,*

*said posts and said bar coacting to define an opening of a first predetermined height and width,*

*a third vertical post adjacent, and coacting with, said first post to define a first passage of unlimited height and of a width smaller than the width of said opening,*

*a fourth vertical post adjacent and coacting with said second post to form a second passage identical with said first passage, said first and second posts and said cross bar recurring, at spaced intervals, to form additional spaced openings,*

*and additional third and fourth posts disposed in the spaces between said openings to form a continuous barrier along a perimeter of said area,*

*said additional third and fourth posts being spaced from each other to form additional passages of unlimited height and of a width smaller than the width of said openings.*

*8. The combination with a building and a vacant and accessible area along a side of the building of means arranged along a portion of the perimeter of said area and coacting with said building for controlling access to said area, said means including*

*first and second spaced, vertical posts and a horizontal cross bar traversing the space between upper portions of said posts,*

*said posts and said bar coacting to define an opening having predetermined height and width,*

*a first series of additional vertical posts disposed adjacent the outer side of said first post,*

*said first series of posts coacting with said first post and with each other, to form a first series of passages, each of which is of unlimited height and of a width different from the width of said opening,*

*a second series of additional posts disposed adjacent the outer side of said second post,*

*said second series of posts coacting with said second post and with each other to produce a second series of passages, each of which is of unlimited height and of a width different from the width of said opening,*

*said first series of additional posts extending from said first post to a first point on a perimeter of said area and said second series of additional posts extending from said second post to a second point on the perimeter of said area barrier to control ingress and egress to the said area between said first and second points.*

*9. The combination with a building and a vacant and accessible area along one side of the building,*

*barrier means arranged along a portion of the perimeter of said area and coacting with said building for controlling ingress to and egress from said area, of persons and objects of a predetermined height and width, said barrier including:*

*first and second, spaced, vertical posts and a horizontal cross bar traversing the space between upper portions of said posts,*

*said first and second posts and said cross bar defining an opening large enough for the passage of an object of said predetermined height and width,*

*a first series of additional vertical posts disposed adjacent of said first post,*

*said first series of posts coacting with each other and with said first post to form a first series of passages, each of which is of unlimited height and of a width smaller than the width of said opening,*

*a second series of additional posts disposed to the outer side of said second post,*

*said second series of posts coacting with each other and with said second post to produce a second series of passages, each of which is of unlimited height and of a width smaller than the width of said opening,*

*said first series of additional posts extending from said first post to a first point adjacent said building and said second series of additional posts extending from said second post to a second point adjacent said building, said first and sec-*

*ond posts and said first and second series of posts coacting to form a barrier between said first and second points.*

References Cited by the Examiner

The following references, cited by the Examiner, are of record in the patented file of this patent or the original patent.

UNITED STATES PATENTS

| | | | |
|---|---|---|---|
| 389,206 | 9/1888 | Delany | 256—22 |
| 641,968 | 1/1900 | Jacobs | 256—1 X |
| 2,015,607 | 9/1935 | Shinn | 49—266 X |

| | | | |
|---|---|---|---|
| 2,315,516 | 4/1943 | Gray | 52—298 X |
| 2,856,220 | 10/1958 | Easley | 49—394 X |
| 3,081,848 | 3/1963 | Nordeng | 52—298 |

FOREIGN PATENTS

| | | |
|---|---|---|
| 310,095 | 7/1933 | Italy. |

DAVID J. WILLIAMOWSKY, *Primary Examiner.*

HARRISON R. MOSELEY, *Examiner.*

D. L. TAYLOR, *Assistant Examiner.*